Feb. 27, 1951     M. A. EDWARDS ET AL     2,543,622

TRACTION VEHICLE WHEEL SLIP CONTROL SYSTEM

Filed Aug. 18, 1949     2 Sheets-Sheet 1

Inventors:
Martin A. Edwards,
Otto A. Keep,
by *Prowell S. Mack*
Their Attorney.

Inventor:
Martin A. Edwards,
Otto A. Keep,
by *Prowell S. Mack*
Their Attorney.

Patented Feb. 27, 1951

2,543,622

UNITED STATES PATENT OFFICE 2,543,622

TRACTION VEHICLE WHEEL SLIP CONTROL SYSTEM

Martin A. Edwards, Scotia, N. Y., and Otto A. Keep, Harborcreek, Pa., assignors to General Electric Company, a corporation of New York Application August 18, 1949, Serial No. 111,054

5 Claims. (Cl. 318—52)

1

Our invention relates to electric power control devices and more particularly to an arrangement for determining wheel slip in a traction vehicle such as an all-electric or gas-electric locomotive utilizing drive motors of the direct current type.

Heretofore difficulties have been encountered in electrically driven vehicles in that where a plurality of wheel driving axles are each driven by a separate motor, slipping of certain of the wheels often occurs due to bad track conditions, or due to tipping of the associated vehicle or truck due to counter-rotation forces opposing armature rotation. If the operator were made aware that wheels were slipping, he would be able to adjust the electric control to correct the condition but simple means providing such indication has not heretofore been made available.

It is an object of the present invention to provide, for an electric vehicle having more than one drive motor, means for determining whether the wheels driven by one of the motors are slipping on the track.

Broadly, the means employed in the embodiments herein illustrated and described comprises an arrangement of saturable reactors each having a plurality of D.-C. bus bars, each bar carrying current to an associated one of the traction motors. Each saturable reactor has A.-C. excitation applied to windings thereof arranged in series with a winding on a transformer having a core common to all the reactor outputs. The output of the transformer is used to provide an indication or otherwise correct the slippage difficulty.

Figure 1:
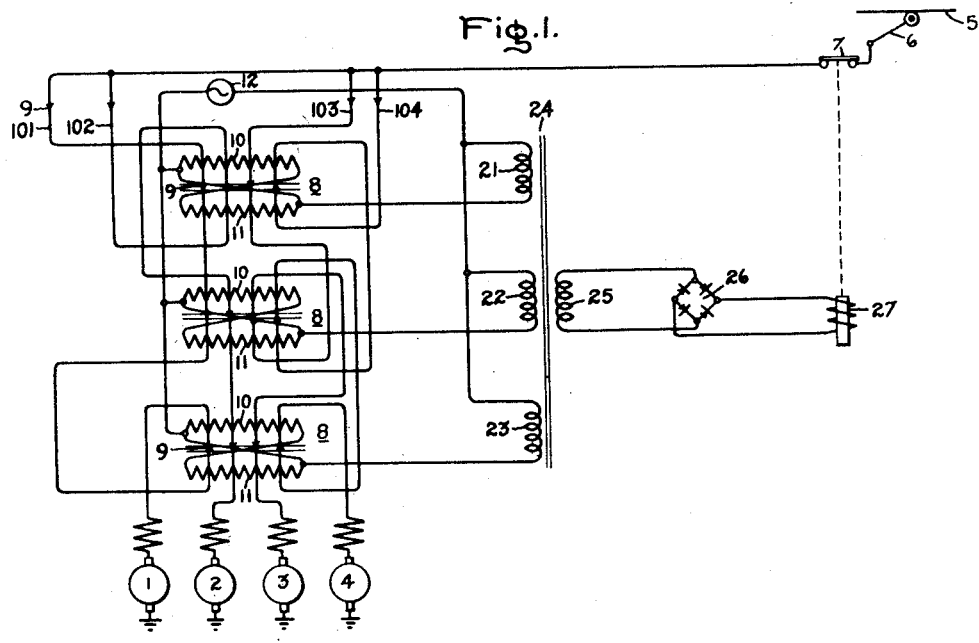
Figure 4:
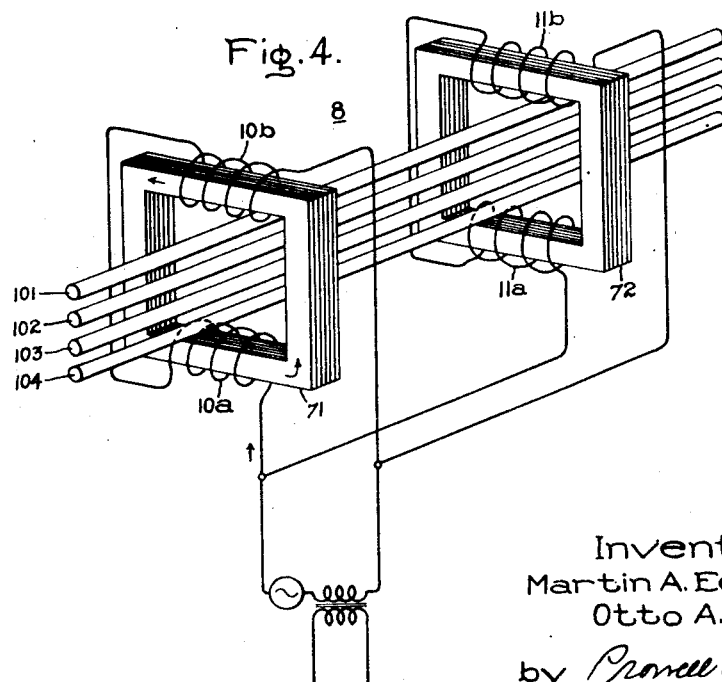
Figure 2:
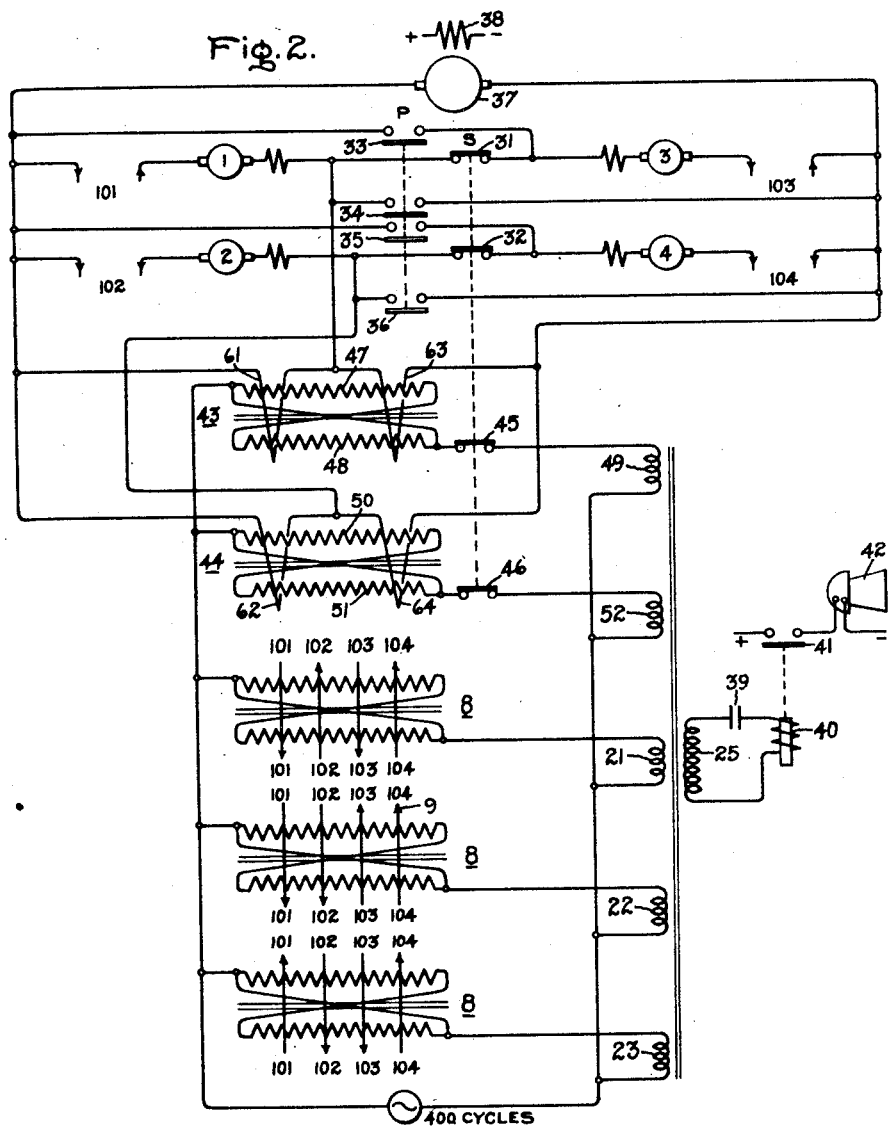
Figure 3:
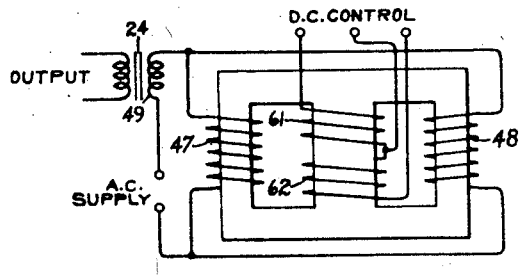

Other objects and advantages will become apparent and our invention will be better understood from consideration of the following description taken in connection with the accompanying drawing, in which Fig. 1 represents a schematic diagram of power and wheel slip control circuits for a trolley powered vehicle having a plurality of drive motors permanently connected in parallel; Fig. 2 represents a schematic diagram of power and wheel slip indication control circuits for a self-powered vehicle having a plurality of motors adapted to be selectively placed in parallel or in series pairs; Fig. 3 represents a conventional saturable reactor in which the saturating flux is provided by two opposed direct current coils; and Fig. 4 represents a saturable reactor in which the saturating flux is provided by a plurality of heavy-current busses which pass through two cores of a single reactor.

Referring now to Fig. 1, a plurality of vehicle wheel-driving motors 1—4 are adapted to be energized from a trolley wire 5, trolley 6, closed contact 7, and, for each motor, through a separate current bus connection, 101—104, respectively. A plurality of bus type saturable reactors, each indicated generally at 8, are interposed between the supply of direct current power and the individual motors in order that the currents to the motors may be compared. While bus type saturable reactors have been known in the past, it should be noted that in the present application each reactor contains a plurality of current bus connections, arranged as hereinafter more fully described in connection with Fig. 4. In each of the reactors 8 the D.-C. (or saturating) flux is balanced at a zero value (for the normal operating condition of all motors drawing equal current) by arrangement of the bus conductors 101—104 therethrough in such manner that in each reactor half of the conductors carry current in one direction while the other half of the total number of conductors carry like values of current in an opposite direction (as indicated by the arrows 9). Inasmuch as it is substantially impossible for all motor driven wheels to slip at the same time, the arrangement of the busses to four motors through three reactors, as shown in Fig. 1, will take care of all possible slipping combinations.

Each reactor 8 is furnished with a pair of A.-C. windings 10 and 11, respectively. Windings 10 and 11 may be connected either in series or in parallel with each other, but they are shown connected in parallel and this has the advantage of increasing the time delay in operation of the associated device.

The A.-C. windings 10 and 11 of each reactor are all connected to be energized by a common A.-C. source diagrammatically represented at 12, with the A.-C. windings of each reactor arranged in series with both this source and a transformer winding (21—23, respectively). Each such transformer winding acts as the output of the associated reactor and as one primary winding of a common transformer having a core 24 and a secondary winding 25. The transformer secondary winding 25 is thus energized responsive to the cumulative output of the three reactors, and its output may be rectified by a full wave rectifier 26 to provide D.-C. energization for a solenoid coil 27 mechanically connected to, when energized, open contact 7 and momentarily remove all power from the motors.

Oftentimes traction motors are placed in series pairs, either permanently or for reduced voltage starting with transition later being made to parallel operation. If two of the motors of Fig. 1 were to be placed in series and the other two motors also placed in series with these series loops in parallel with each other, the system would not under all conditions be operative, because it would be possibe for one motor in each series loop to slip with a consequent increase of its back E. M. F. but with no change of current. In such a case the current measuring device would not operate since the current to the four motors would be exactly the same. In Fig. 2 we have shown a schematic diagram of power and control circuits arranged to take care of such a situation.

The motors 1–4 of Fig. 2 may be selectively placed either in series pairs or, by opening the S contacts 31 and 32 and closing the P contacts 33–36, all in parallel with each other.

In Fig. 2, the motors are shown as being adapted to be energized from a direct current generator 37 having a field exciting winding 38. The generator is assumed adapted to be mechanically driven in conventional manner as by a Diesel engine (not shown). Current supplied by the generator is provided to each motor through a separate current supply connector, 101–104, respectively, with each connecter extending through each of three reactors 8 as in Fig. 1. For parallel operation of the motors the control functions as in Fig. 1, except that in Fig. 2 we have shown the output of transformer 24 secondary winding 25 passed through a nonlinear resonant circuit (comprising a capacitor 39) to an A.-C. type solenoid 40 which, when energized, will close a contact 41 to sound a warning horn 42, thereby to notify the engineer that wheels are slipping and that he should notch his controller back or otherwise correct the condition.

For series operation of the drive motors, additional saturable reactors 43 and 44 are brought into the control circuit through the action of S interlocks 45 and 46. Reactor 43 is provided with parallel A.-C. coils 47 and 48 adapted, when interlock 45 is closed, to be energized from the 400 cycle source in series with primary winding 49 of transformer 24. Reactor 44 is provided with paralleled A.-C. coils 50 and 51 adapted, when interlock 46 is closed, to be energized through transformer primary winding 52. Saturable reactor 43 has a voltage responsive D.-C. winding 61 connected across motor 1 and a similar D.-C. winding 63 arranged astatically with respect to winding 61 and connected across motor 3 which is the other motor of the same series pair. Similarly, D.-C. coils 62 and 64 of reactor 44 are connected across motors 2 and 4, respectively, and arranged to balance out when the voltages across the two motors are equal. If there is wheel slipping involving one motor of either series pair, the voltage across it and across the associated D.-C. coil will be considerably higher, the reactor will saturate and an indication will be furnished.

It will be understood by those skilled in the art that the voltage responsive saturable reactors 43 and 44 may take the form of the conventional three-legged core type shown in Fig. 3 in which the A.-C. coils, such as 47 and 48, are placed on the outer legs and are connected so that the A.-C. flux passes through the outside iron path but not through the center leg which carries one or more D.-C. coils, such as 61 and 63. The D.-C. coils on the center leg will, unless their cumulative effect balances out, set up a saturating flux which lowers the effective permeability of the outer legs so that the reactance of the A.-C. coils is reduced and the A.-C. load current and output voltage are increased.

The bus bar type reactor is a modification of the saturable reactor but does not have D.-C. coils. Instead the saturating flux is usually provided by a heavy current bus which passes through two independent cores. As indicated in Fig. 4, a reactor such as 8 (of Figs. 1 and 2) may comprise a plurality of bus conductors 101–104 passing through two laminated iron cores 71 and 72. The A.-C. windings 10 and 11 (Figs. 1, 2 and 4) are differentially wound on the two cores and with reactors of this type we have found it desirable to wind one-half (such as 10a) of each A.-C. coil on one leg of the core and the other half (such as 10b) on the opposite leg of the same core so that the flux produced by the two coil halves add in such manner as to take care of the non-symmetrical location of the busbars running through the reactor core. Furthermore, in case of movement of one or more busses with respect to the core the calibration of the reactor will not be affected when such an arrangement is employed.

In operation of the scheme shown in Fig. 1 (embodying reactors such as that shown in Fig. 4), irrespective of which motor or combination of motors is slipping, the consequent increase of motor speed will result in a reduction of motor current which will cause the D.-C. flux to become unbalanced in at least one of the three reactors, resulting in a change of A.-C. impedance, an increase of current through the A.-C. coils, and consequent temporary removal of D.-C. power, which should correct the condition.

In operation of the scheme of Fig. 2 (embodying reactors shown in Figs. 3 and 4), with wheel slippage there will either be a decrease of motor current or an increase of motor voltage (or both) with a consequent change of A.-C. impedance reflected through the transformer to its secondary winding, and when the transformer secondary impedance nearly equals that of capacitor 39 there will be a large increase of voltage and current to operate the relay 40 which consequently may be of inexpensive type and still have proper pickup and dropout characteristics when used in such a circuit. Of course, the resonant circuit of Fig. 2 is not a mere equivalent of the rectifier of Fig. 1, and depending on various design considerations it may be found desirable to use either the rectifier or the resonant circuit, or both in combination.

While we have illustrated and described particular embodiments of our invention, modifications thereof will occur to those skilled in the art. We desire it to be understood, therefore, that our invention is not to be limited to the particular arrangements disclosed, and we intend in the appended claims to cover all modifications which do not depart from the spirit and scope of our invention.

What we claim as new and desire to secure by Letters Patent of the United States is:

1. A power system for an electric vehicle comprising a plurality of similar wheel driving D. C. motors, a source of D. C. power supply for said motors, a separate bus connection connecting each of said motors to said source, a plurality of saturable reactors of the bus type each operatively associated with all of said bus connections to be responsive to unbalance of current therethrough, each of said reactors having at least one A. C. winding, means for energizing said A. C. windings, means associated with each of said A. C. windings for deriving an A. C. output from each of said reactors variable responsive to the unbalance of D. C. current in the associated bus connections, said means including a transformer having primary windings each connected to the output of a different one of said reactors, a secondary winding on said transformer for deriving an output therefrom, and control means adapted to be energized from said transformer secondary winding thereby to be operative upon the occurrence of wheel slippage in said vehicle with consequent unbalance of D. C. bus currents through one or more of said saturable reactors.

2. A power system for a vehicle including a plurality of D. C. vehicle driving motors, a plurality of bus type saturable reactors each comprising two separate magnetic core portions arranged around a common plurality of bus connectors, means for connecting each of said motors to a source of power supply through bus connectors extending through all of said saturable reactors with each bus connector arranged to extend through each saturable reactor in a direction which will provide a direction of current flow which when considered with current flow through all other bus connectors during normal operation of said motors will cause a consequent balance of D. C. flux in each of said reactors, an A. C. winding on each core portion of each of said reactors, each of said A. C. windings comprising a half coil on one leg of each of said cores and a half coil on an opposite leg of each of said cores, with the A. C. windings on different cores of the same reactor arranged to produce out-of-phase flux components, a source of alternating current for said A. C. windings, a transformer having a plurality of primary windings, each arranged in series with said alternating current source and in series with a different one of said primary windings, a secondary winding on said transformer, a rectifier connected to said secondary windings, and means for utilizing the rectified output of said rectifier to initiate a correcting action when said motor currents become unbalanced.

3. A power system for a self propelled vehicle including a prime mover, a D. C. generator arranged to be driven by said prime mover, a plurality of D. C. motors of similar rating and adapted to drive different wheels of said vehicle, means including a separate current bus bar for electrically connecting each of said motors to said generator, means for selectively placing said motors in series or parallel circuit relation, a plurality of saturable reactors of the bus bar type each comprising two separate cores of magnetic material having all of said bus bars passing therethrough in such direction that for normal operation the core exciting effect of the current in one half of the total number of bus bars will be opposed by the core exciting effect of the current in the other half of the total number of bus bars, and at least one additional saturable reactor arranged to be operative only when said motors are in series connection and having oppositely wound saturating windings each connected across a different one of said motors to be responsive to the voltage thereacross, means for providing A. C. energization to all of said bus type saturable reactors, means for determining the cumulative output of said bus type reactors thereby to determine the relative unbalance of current supplied to said motors at any time, means for providing A. C. energization to said additional saturable reactor during series operation of said motors, and means for determining unbalance in said additional reactor thereby to also determine the relative unbalance of voltages across said motors during series operation.

4. In combination with a plurality of electric motors connected to drive spaced wheels of a vehicle, direct current supply means for said motors, means including a separate connection from said supply to each of said motors for supplying current to said motors in parallel circuit relation with each other, means including a plurality of saturable reactors each arranged around all of said current supply connections to have the saturating flux thereof provided by unbalance of current in said connections, each of said saturable reactors comprising two laminated core members each having alternating current windinds on opposite legs thereof to provide compensation for the non-symmetrical location of the connections running through the reactor cores, means for energizing the alternating current coils of each of said reactors through a load, and means electrically associated with said load for providing an indication of unbalance of currents through said connections adapted to supply current to said motors and extending through said saturable reactors.

5. A saturable reactor comprising a plurality of bus bars, magnetically separate cores of laminated magnetic material arranged around said bus bars, and means for respectively connecting said bus bars in circuits in which the magnitudes of the currents flowing therethrough may vary relative to each other, each of said cores having an A. C. winding arranged one half around said core on one side of said bus bars and one half around said core on the opposite side of said bus bars.

MARTIN A. EDWARDS.
OTTO A. KEEP.

REFERENCES CITED

The following references are of record in the file of this patent:

UNITED STATES PATENTS

| Number | Name | Date |
|---|---|---|
| 2,023,860 | Stanton | Dec. 10, 1935 |
| 2,294,709 | Bechmann et al. | Sept. 1, 1942 |
| 2,316,928 | Woodward | Apr. 20, 1943 |
| 2,476,787 | Wellings | July 19, 1949 |
| 2,494,852 | Winterhalter et al. | Jan. 17, 1950 |